United States Patent
Neuschwander et al.

(10) Patent No.: US 6,648,939 B2
(45) Date of Patent: Nov. 18, 2003

(54) INERTIAL SEPARATOR

(75) Inventors: Helmut Neuschwander, Ludwigsburg (DE); Pius Trautmann, Stuttgart (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/153,851

(22) Filed: May 24, 2002

(65) Prior Publication Data

US 2002/0189213 A1 Dec. 19, 2002

(30) Foreign Application Priority Data

May 25, 2001 (DE) .......................... 101 25 404

(51) Int. Cl.$^7$ ............................... B01D 45/00
(52) U.S. Cl. ............................ 55/423; 55/433; 55/444; 55/446; 55/DIG. 14; 96/190; 123/198 E
(58) Field of Search .................. 55/385.3, 423, 55/433, 444, 446, DIG. 14; 96/189, 190; 123/198 E (56) References Cited

U.S. PATENT DOCUMENTS

| 514,439 A | * | 2/1894 | Blessing | 55/444 |
| 692,390 A | * | 2/1902 | Waggone | 55/444 |
| 1,044,208 A | * | 11/1912 | Luhn | 55/444 |
| 5,342,422 A | | 8/1994 | Wimboeck | |

FOREIGN PATENT DOCUMENTS

| DE | 2720201 | 11/1978 |
| DE | 8517835 | 11/1985 |
| DE | 9112707 | 2/1992 |
| DE | 200 04 131 | 3/2000 |
| FR | 1056258 | 2/1954 |
| FR | 2164984 | 8/1973 |

\* cited by examiner

*Primary Examiner*—Robert Hopkins
(74) *Attorney, Agent, or Firm*—Crowell & Moring LLP (57) ABSTRACT

An inertial separator (10) for removing droplets from a gas stream. The inertial separator (10) has a housing (18) which is provided with an inlet (11) for untreated gas and an outlet (12) for treated gas. In the housing (18) are first and second separation lamellae (13), with at least two first separation lamellae (13) being linearly arranged next to one another and separated by an interval A. The separation lamellae (13) each have a concave side (14) and a convex side (15). The first separation lamellae (13) are arranged parallel to the second separation lamellae (13) with the concave sides (14) of the separation lamellae (13) facing one another. The lowest region of the concave side (14) of the first separation lamellae (13) is situated opposite the interval A between the second separation lamellae (13). Viewed in the direction of flow, a drainage slope (16) which extends obliquely to the separation lamellae (13) is arranged on the second separation lamellae (13). This drainage slope (16) projects under the first separation lamellae (13), thereby preventing unpurified gas from exiting through the outlet (12).

11 Claims, 6 Drawing Sheets

INERTIAL SEPARATOR

BACKGROUND OF THE INVENTION

The present invention relates to an inertial separator, and to an oil module, a cylinder head cover, and an intake module in which such an inertial separator is integrated.

An inertial separator for mechanically separating liquids and/or solid particles from a gas stream is known from German Patent Application No. DE 200 04 131. This inertial separator comprises two sheet metal shells mutually connected to a hollow body. Profiles are arranged parallel to one another at regular intervals in the sheet metal shells. The profiles in the first sheet metal shell are opened in the direction of the gas flow, and the profiles in the second sheet metal shell are opened in the direction opposing the gas flow. The profiles are formed by the incorporation of slots in the sheet metal shells with subsequent bending of the slotted regions. The bent regions interlock with one another, thereby reversing the gas stream twice before it passes through the inertial separator. This double reversal of the gas stream causes droplets or solid particles entrained in the gas stream to be propelled by centrifugal force against the profile. A liquid film thus forms on the interior of the profile which slowly drains down into a collecting channel.

Similar inertial separators are also known from Wimboeck, U.S. Pat. No. 5,342,422 (=EP 615 098).

Bending of the slotted regions creates transition zones in which there is insufficient reversal of the gas stream between the profiles. In this design, impurities may be impelled through the inertial separator, thereby impairing its efficiency.

SUMMARY OF THE INVENTION

It is an object of the invention to provide an improved inertial separator.

Another object of the invention is to provide an inertial separator which reliably removes impurities from a gas stream.

These and other objects are achieved in accordance with the present invention by providing an inertial separator for separating particles or droplets from a gas stream, the separator comprising a gas inlet, a gas outlet; a plurality of separation lamellae arranged between the inlet and the outlet, the separation lamellae each having an arcuately-shaped design with a concave side and a convex side; at least two first separation lamellae being linearly arranged next to one another separated by an interval A with their convex sides facing the inlet, and at least two second separation lamellae being arranged offset from the linearly arranged first separation lamellae with the concave sides of the second separation lamellae arranged opposite the concave sides of the first separation lamellae, and a drainage slope for the separated impurities provided on the separation lamellae.

The inertial separator according to the invention is advantageously suited for removing impurities such as dust or liquid droplets from a gas stream. To this end, the inertial separator comprises a housing with an inlet through which the gas to be purified enters the inertial separator and an outlet through which the purified gas exits. The inlet may have various cross sections, such as circular or rectangular shapes, for example. The outlet likewise may also have any desired cross section. However, the cross sections of the inlet and of the outlet need not correspond to one another. For example, the inlet may be designed as a circular bore and the outlet as a rectangular aperture. In other variants, the inlet and outlet may correspond to one another in area as well as in cross-sectional shape.

Arcuately-shaped separation lamellae are arranged in the housing between the inlet and the outlet. The separation lamellae have a concave side and a convex side as a result of their arcuately-shaped design. The separation lamellae may also have, for example, an undulating shape with a plurality of inflection points. The separation lamellae may be made of synthetic resin material, for example, to reduce the weight of the component, although of course other materials such as metals may be used to produce the separation lamellae. The choice of material for the separation lamellae depends on the required material properties or environmental conditions. Metallic materials are better suited for high temperatures, whereas synthetic resin materials may be preferred under low thermal loads for cost reasons.

The inertial separator has at least two first separation lamellae which are linearly arranged next to one another and separated by an interval. This interval creates a gap between the first separation lamellae, which are situated with their convex sides facing the inlet. Second separation lamellae, likewise linearly arranged, are provided offset from the linearly arranged first separation lamellae. These second separation lamellae are arranged with their concave sides opposite the concave sides of the first separation lamellae.

A drainage slope is provided on the separation lamellae on which the separated impurities can drain off. A separate drainage slope may be provided on each individual separation lamella. Alternatively, a single drainage slope may join all first separation lamellae or all second separation lamellae, or all first and second separation lamellae combined. The drainage slope preferably extends at an angle between 0° and 90° relative to the inlet. The separated impurities slide downward via the drainage slope, and thus can no longer be carried through the inertial separator. In addition, the drainage slope prevents a leakage air stream from flowing past the separation lamellae.

Separated impurities such as oil may be conducted from the drainage slope back to the untreated oil side, thereby being returned to the oil circulation system. Other impurities such as dust, if not recirculated, are conveyed to a waste receptacle, for example, which is emptied as needed.

To facilitate the sliding of impurities down the drainage slope, the drainage slope may be provided with a surface structure which agglomerates the impurities and thus accelerates their sliding motion. The surface structure may be provided with indentations or channels which are arranged, for example, parallel or at any desired angle to the direction of the incoming gas flow.

The gas flowing through the inlet is deflected and guided by the convex sides of the separation lamellae into the gap between the first separation lamellae. The gas stream is "bundled" by the gap and impacts against the center of the concave side of the second separation lamellae. Impingement of the gas stream on the second separation lamellae causes the impurities to be propelled against the separation lamellae, where drop-like impurities adhere and flow off. Dust-like impurities likewise fall downward.

The gas stream is divided by the concave side and its flow is reversed. The reversal of the gas stream occurs in the region of the greatest acceleration, with the impurities being pressed against the separation lamellae by centrifugal force. After this first reversal the gas stream is turned back to the first separation lamellae, where it impacts against the concave sides of the first row of separation lamellae. The remaining impurities in the gas stream are separated on these first separation lamellae. The gas stream is again reversed by the concave sides of the first separation lamellae, and thus "bundled," the purified gas can then exit from the inertial separator through the outlet.

Depending on the purity of gas required after the impurities are separated, a plurality of successive rows of separation lamellae may be provided. The purer that the gas exiting the outlet is required to be, the greater the number of successive rows of separation lamellae that are provided.

Furthermore, the degree of purity of the gas may also be regulated by the size of the gap between the separation lamellae. The higher the required purity of the gas, the narrower the gap that is chosen. In this regard it is important that the pressure drop caused by the inertial separator increases as the gap size decreases. Therefore, the gap size should be chosen to be as large as possible in order to optimize the ratio of the separation rate to the pressure drop.

The separation lamellae are designed with a wall thickness as small as possible which at the same time assures sufficient stability of the separation lamellae. To this end, the wall thickness of the separation lamellae may be 0.1 to 10 mm. The stability of the separation lamellae must be adjusted to the operating conditions or the loads, for example, the incoming gas flow rate, which act on the separation lamellae. The wall thickness of the separation lamellae depends on the material used. Smaller wall thicknesses may be used with higher-strength materials than with lesser-strength materials. The size and weight of the inertial separator may be reduced by use of correspondingly thin separation lamellae.

In accordance with one advantageous embodiment of the invention, the drainage slope is provided on the second separation lamellae. The drainage slope may be designed, for example, as a single piece with the separation lamellae. Alternatively, the drainage slope may be designed as a separate component and be connected to the second row of separation lamellae. In such case, the drainage slope may be connected to the second separation lamellae in a detachable manner, such as with screws, or in an undetachable manner, such as with adhesive. As a result of this design, the separation lamellae have a shape that is simple and economical to produce.

According to one embodiment of the invention, the drainage slope terminates at the first separation lamellae, with a small space existing between the drainage slope and the first separation lamellae through which the separated impurities can drain away. By providing the drainage slope underneath the first separation lamellae, the separated impurities from the first and second separation lamellae may be removed via the same drainage slope. Furthermore, this drainage slope prevents a portion of the gas stream from bypassing the separation lamellae and escaping unpurified through the outlet.

It is advantageous to provide a drip spout on the drainage slope to allow better drainage of impurities into a collection chamber. This drip spout has a downwardly tapering design which facilitates detachment of individual drops at the lower end of the drip spout.

In a further embodiment of the invention, the separation lamellae are arranged at an angle between 90° and 180° relative to the inlet. With this arrangement, the inflowing gas first impinges on the first separation lamellae and is caused to flow along the lamellae, thereby separating initial impurities. As a result of this arrangement, the gas stream is also "gently" reversed, thereby preventing extreme turbulence.

It is advantageous to design the separation lamellae for optimum flow in their lateral end regions along the vertical edge which form the termination of the arcuate shape. This prevents the gas from separating from the separation lamellae, and minimizes the pressure drop caused by the separation lamellae. The flow-optimized edge or end regions may be designed as curves or points, for example. When the edge regions are designed as points, the wall thickness of the separation lamellae constantly tapers until no more material is present. Thus, there is no longer a surface at the edge regions to which the impurities may adhere.

In particular designs of the invention, the separation lamellae are constructed as circular segments, especially corresponding to one-quarter to three-quarters of a circle. These circular segments are simple to produce, and also have a continuous arcuate shape without inflection points which reduces the pressure drop in the inertial separator. The first separation lamellae may be arranged at any desired distance from the second separation lamellae, with the first and second separation lamellae also partially overlapping or interlocking with one another. The closer the arrangement of the separation lamellae to one another, the higher the separation rate of impurities.

In accordance with another embodiment of the invention, a closeable liquid drain is mounted in the housing underneath the separation lamellae. This liquid drain enables liquid separated from the gas stream to be returned to a liquid container or to be removed from the system for disposal.

A valve may be disposed on this liquid drain which is capable of being opened as needed. The valve may be opened automatically by a control or regulator, or manually by service personnel. It is advantageous to situate the liquid drain at the lowest point in a collection chamber for separated impurities. Collection of the impurities via the liquid drain allows the collection chamber to be emptied in a most efficient manner. If only dry particles are separated from the gas stream, these can naturally be removed via the liquid drain, with the liquid drain then acting as a dust discharge.

An oil module for an internal combustion engine has an untreated oil side with an untreated oil inlet and a treated oil side with a treated oil outlet. An oil filter element is arranged between the untreated oil inlet and the treated oil outlet which seals off the untreated oil side from the treated oil side and filters impurities from the oil. This oil module has an inlet aperture for crankcase gas, with the crankcase gas being conducted through an inertial separator as described above and de-oiled. The de-oiled gas exits the oil module through a gas outlet. The separated oil is conveyed to the untreated oil side and thus returned to the oil circulation system.

A cylinder head cover for covering a cylinder head of an internal combustion engine has a gas inlet connection and a gas outlet connection. An inertial separator as described above is arranged between the gas inlet connection and the gas outlet connection. Arranging the inertial separator on the cylinder head cover allows installation spaces, which otherwise would remain unused for design reasons, to be used to separate impurities from a gas. Thus, contaminated gas streams present in a region near the engine may be purified over the shortest distance and returned to circulation. The purification of crankcase gas represents an advantageous use of the inertial separator integrated into the cylinder head cover.

In a further embodiment, at least one cyclone separator is connected downstream of the inertial separator for further cleaning gas which has been pre-cleaned by the inertial separator. The combination of both separation devices facilitates the optimal removal of impurities from the gas.

An intake module for an internal combustion engine has an air inlet and an air outlet, with the air inlet connected so as to communicate with the internal combustion engine. An inertial separator of the type described above is arranged between the air inlet and the internal combustion engine. Various components such as an air filter, an air flow sensor, flaps or valves may also be installed. The inertial separator purifies the air entering the intake module by removing impurities such as dust or water droplets. This inertial separator may be used instead of or in addition to an air filter. When the inertial separator is combined with an air filter, the air is crudely pre-cleaned by the inertial separator, resulting in only a slight pressure drop. In addition, the service life of the filter element is increased, since coarse dirt particles no longer clog the filter.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
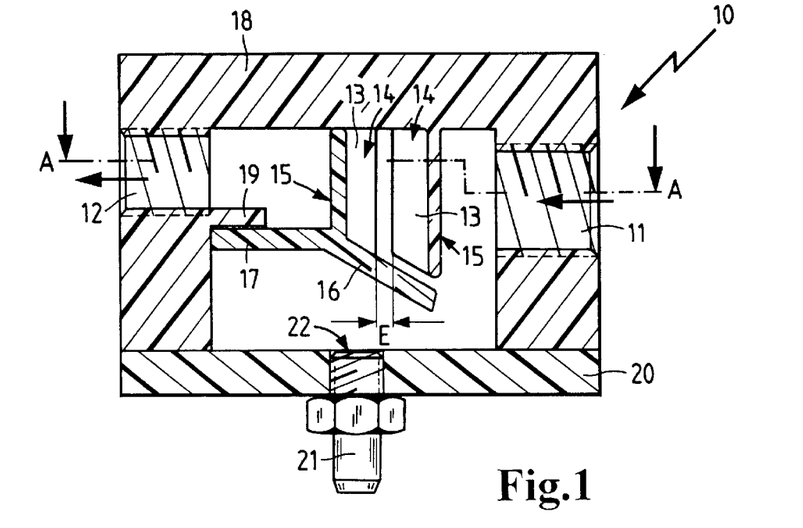
FIG. 1 shows an inertial separator in a sectional view taken along line B—B of FIG. 2.
Figure 2:
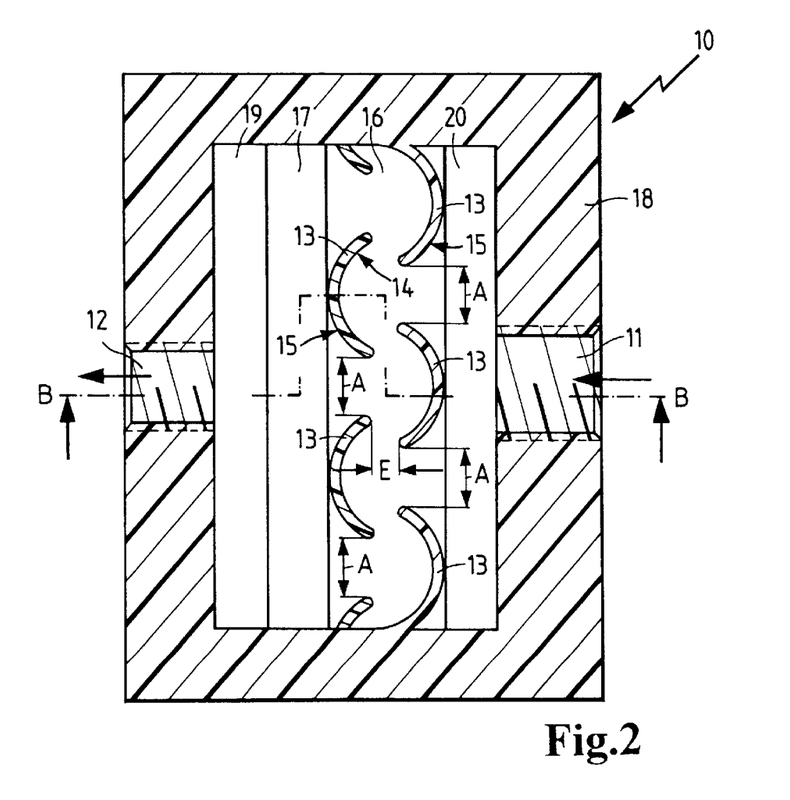
FIG. 2 shows a second sectional view of the inertial separator of FIG. 1 taken along line A—A.

FIG. 1 shows an inertial separator 10 in cross section along the sectional line B—B according to FIG. 2. Inertial separator 10 is provided with an inlet 11 and an outlet 12. Outlet 12 is separated from inlet 11 by separation lamellae 13 which are arranged in two parallel rows. Separation lamellae 13 are arcuately-shaped (see FIG. 2), and thus each have a concave side 14 and a convex side 15. The first row of separation lamellae 13 in the direction of flow are situated with their convex sides 15 facing inlet 11. The separation lamellae 13 arranged the next row in the direction of flow are situated with their concave sides 14 facing toward inlet 11. Thus, the concave sides 14 of the two parallel rows of separation lamellae 13 are disposed opposite one another.

In order to effect multiple reversals of the gas flow, the rows of separation lamellae 13 are offset relative to one another by approximately one-half arc. The two rows of separation lamellae 13 are arranged at a distance E of approximately 2 mm from one another.

In this illustrative embodiment, a drainage slope 16 is disposed on the second row of separation lamellae 13 in the direction of flow. This drainage slope 16 is constructed as one piece with the second row of separation lamellae 13. In the illustrated embodiment, the drainage slope extends at an angle of approximately 30° relative to inlet 11. This angle may be increased or decreased, depending on which substances are to be removed from the gas stream.

An attachment surface 17 is provided to affix second separation lamellae 13 and drainage slope 16 to a housing 18 which forms inertial separator 10. The component comprising second separation lamellae 13 and drainage slope 16 is made of synthetic resin material and may be produced, for example, by an injection molding process. Housing 18 is also made of synthetic resin material with inlet 11 and outlet 12 being integrated into the housing 18. Of course, separation lamellae 13 and housing 18 may also be made of other materials such as, for example, metal or ceramic.

First separation lamellae 13 are constructed in one piece with housing 18. In order to affix second separation lamellae 13 in a defined position with respect to first separation lamellae 13, housing 18 has an assembly member 19. Fastening surface 17 is affixed to this assembly member 19 with adhesive. As an alternative to this undetachable fastening, the drainage slope may also be fastened to assembly 19 by means of detachable connections such as screws or snap connections.

Housing 18 is sealingly closed with a cover plate 20, so that the gas to be purified can only flow in through inlet 11 and out through outlet 12. In cover plate 20, which also may be made of synthetic resin material, there is a drain plug 21 which is screwed into a liquid drain 22. This drain plug 21 may be removed as needed, thus allowing the separated impurities to be removed from inertial separator 10.

FIG. 2 shows a cross-sectional view of an inertial separator 10 along sectional line A—A according to FIG. 1. Parts which correspond to FIG. 1 are identified by the same reference numerals. The first row of separation lamellae 13 comprises three separation lamellae 13 arranged next to one another and separated from one another by intervals A. Each interval A is the same for first separation lamellae 13 as well as second separation lamellae 13.

The gas to be purified flows through inlet 11 into inertial separator 10. The gas impinges on the row of first separation lamellae 13, thereby being deflected in such a way that it has to flow through intervals A between the separation lamellae 13 of the first row. Because the separation lamellae 13 of the second row are arranged behind intervals A in the direction of flow, the gas cannot flow directly to outlet 12.

Second separation lamellae 13 are arranged in such a way that the lowest region of concave side 14 is situated directly behind interval A. The gas stream is deflected again by concave side 14 of second separation lamellae 13, with a portion of the impurities impinging against separation lamellae 13 and no longer being entrained in the gas flow. These separated impurities slide or flow downward in the direction of drainage slope 16.

The gas stream which is reversed by concave side 14 of second separation lamellae 13 impacts against the concave side 14 of first separation lamellae 13, where an additional portion of the impurities is separated from the gas stream.

These impurities also slide or flow downward in the direction of drainage slope 16. The gas stream is again reversed by concave side 14 of first separation lamellae 13, whereby the gas stream is guided in the direction of outlet 12, and the purified gas exits inertial separator 10.

Figure 3:
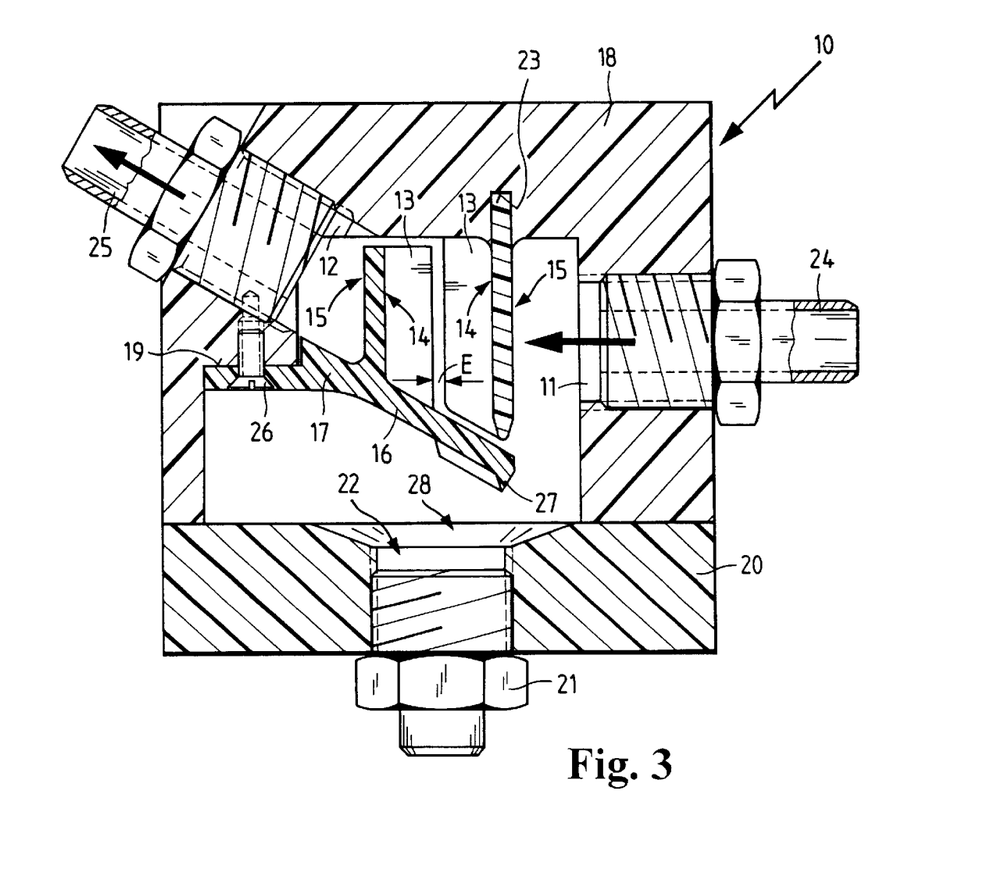
FIG. 3 shows a sectional view of a second inertial separator embodiment according to the invention.

FIG. 3 shows a variant of an inertial separator 10 in a cross-sectional view along sectional line B—B according to FIG. 2. Parts which correspond to FIG. 1 are identified by the same reference numerals. In this variant, which essentially corresponds to FIG. 1, the first row of separation lamellae 13 and the housing 18 are constructed as separate parts which are assembled together.

Housing 18 has a receptacle 23 in which the first row of separation lamellae 13 are glued in place. First separation lamellae 13 may be attached to the housing individually, that is, with each separation lamella 13 connected alone, or by means of a bar (not shown), that is, with all the first separation lamellae 13 connected to the bar (not shown). In this embodiment, housing 18 may be made of a different material than that comprising separation lamellae 13. Of course, second separation lamellae 13 as well may be connected to housing 18 in the same manner as for first separation lamellae 13.

In this illustrative embodiment, outlet 12 is disposed at a 30° angle relative to inlet 11. An inlet connector 24 is mounted in inlet 11, and an outlet connector 25 is mounted in outlet 12. Both connectors 24, 25 may be attached to gas lines (not shown). In this illustrative embodiment, second separation lamellae 13 are attached to housing 18 by screws 26 which extend through fastening surface 17.

A drip spout 27 is arranged on drainage slope 16, which is disposed parallel to outlet 12, in this illustrative embodiment. This drip spout 27 terminates drainage slope 16 and tapers downward. By means of the tapered portion, the impurities separated from the gas stream are released more easily and drop onto cover plate 20, which is provided with an indentation or depression 28. Indentation 28 is designed in such a way that the impurities flow into liquid drain 22. Drain plug 21 is screwed out as needed, thereby allowing the separated liquid to drain out.

Figure 4:
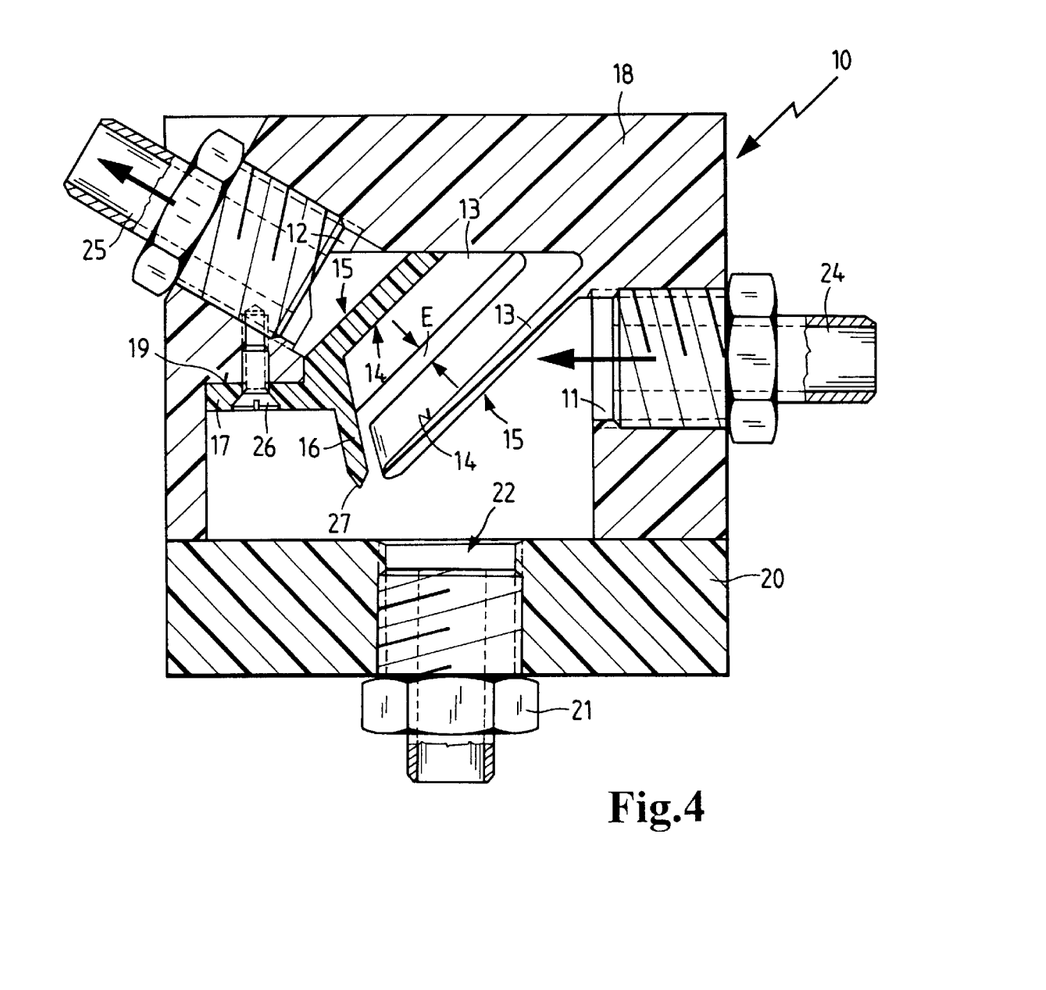
FIG. 4 shows a sectional view of a third inertial separator embodiment according to the invention.

FIG. 4 shows a variant of an inertial separator 10 in a cross-sectional view. Parts which correspond to FIG. 3 are provided with identical reference numbers. In this variant, outlet 12 is disposed at a 30° angle to inlet 11, analogous to FIG. 3. However, cover plate 20 has no indentation 28.

In this embodiment, separation lamellae 13 are disposed at an angle of 45° relative to inlet 11. Drainage slope 16 extends at an angle of approximately 80° to inlet 11. At its lower end, the drainage slope is provided with drop edge 27 which enables the separated liquid to drain off.

The gas to be cleaned of impurities enters inertial separator 10 through inlet 11. The gas impacts against obliquely disposed separation lamellae 13, where initial impurities are separated. The gas then undergoes multiple deflections or reversals via separation lamellae 13, thereby separating additional impurities. The resulting purified gas exits the inertial separator via outlet 12. The separated impurities flow along separation lamellae 13 and drainage slope 16 in the direction of liquid drain 22.

Drain plug 21 is screwed into liquid drain 22. Drain plug 21 is designed as a connector, which may be joined to a hose (not shown), thus allowing the separated liquid to be continuously discharged from the interior of inertial separator 10.

Figure 5:
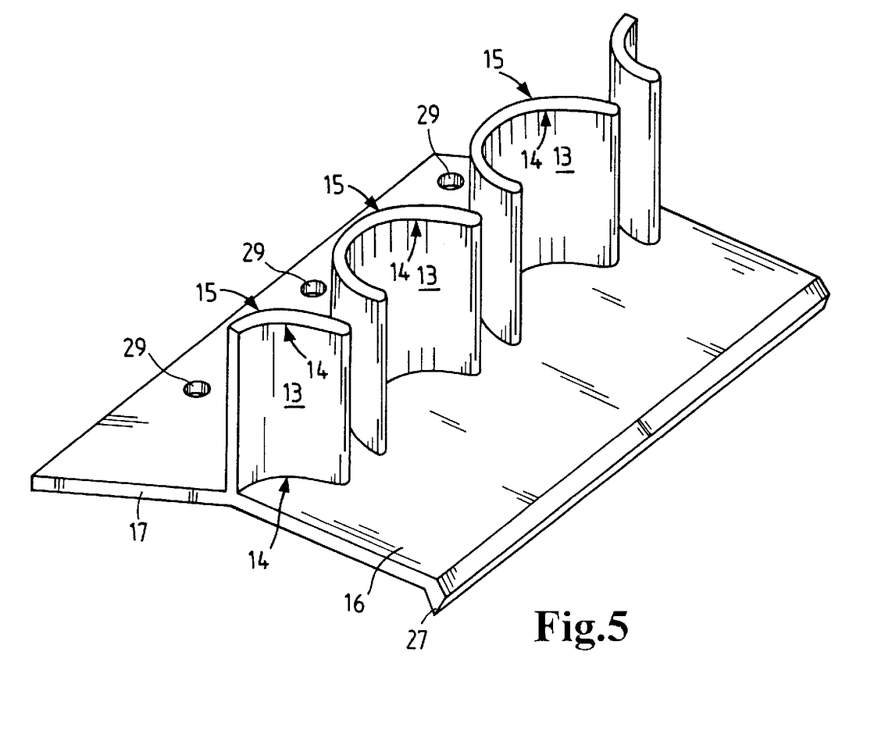
FIG. 5 is a perspective view of a row of second separation lamellae with an integral drainage slope.

FIG. 5 shows a row of second separation lamellae 13 along with their drainage slope 16 according to FIG. 3, in a perspective view. Parts which correspond to FIG. 3 are provided with identical reference numbers. Separation lamellae 13 are constructed in one piece with drainage slope 16 and fastening surface 17. Three fastening holes 29 are situated in fastening surface 17 through which screws 26 (see FIG. 3) may be inserted and screwed into housing 18 (see FIG. 3).

Figure 6:
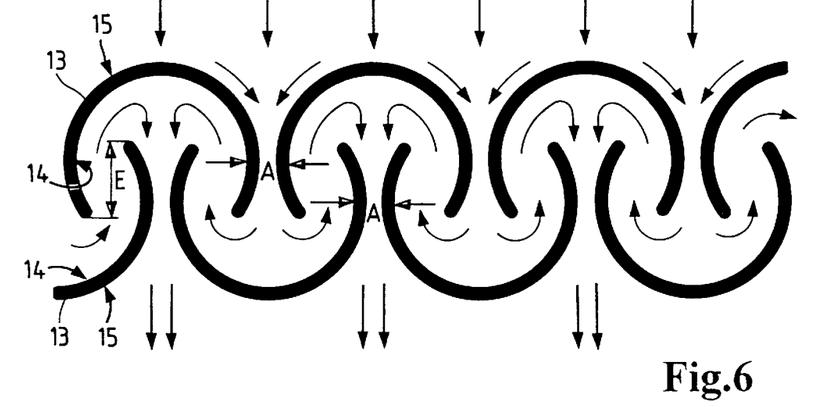
FIG. 6 shows a schematic diagram of a flow stream in an inertial separator embodiment.

FIG. 6 shows a schematic diagram of a flow stream through separation lamellae 13. Parts which correspond to FIG. 2 are provided with identical reference numbers. In this embodiment, first and second separation lamellae 13 are designed as three-quarter circular arcs which partially overlap or interlock with one another. The distance E between the respective first and second separation lamellae 13 has a negative sign as the result of the interlocking of separation lamellae 13. The absolute value of distance E, and thus the amount by which first and second separation lamellae 13 overlap, may be dimensioned depending on the impurities to be separated. Interval A between separation lamellae 13 of a row may likewise have a value from a few millimeters to several centimeters, and may be dimensioned depending on the impurities to be separated.

The gas to be purified flows vertically along the path indicated by arrows to first separation lamellae 13. The gas stream is deflected in an arc-shaped pattern by separation lamellae 13 and must flow through interval A between separation lamellae 13 arranged next to one another. The gas stream is accelerated as a result of the small cross-sectional area between first separation lamellae 13, and impacts against the concave sides 14 of the second row of separation lamellae 13 at maximum velocity.

The arcuate shape of second separation lamellae 13 causes the gas flow to reverse and impact against the concave sides 14 of first separation lamellae 13. There, the gas stream is reversed again and is guided through interval A between the second lamellae to the outlet (not shown).

Figure 7:
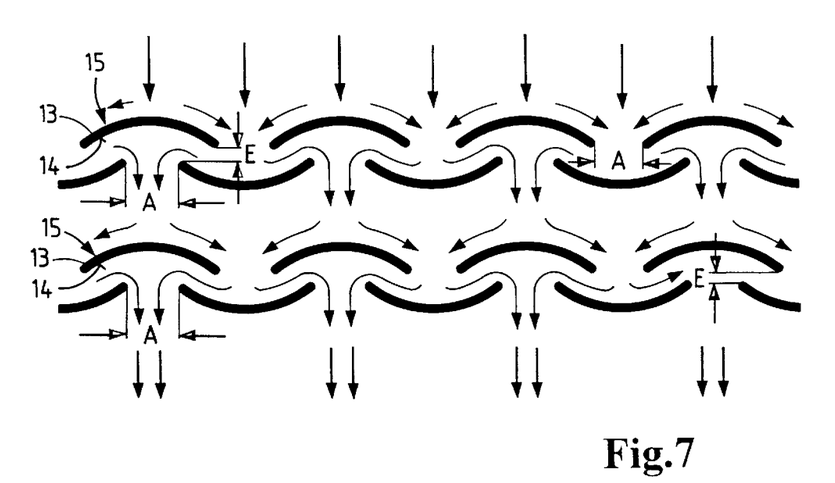
FIG. 7 shows a schematic diagram of a flow stream in another inertial separator embodiment.

FIG. 7 shows a schematic diagram of an alternative flow stream through separation lamellae 13. Parts which correspond to FIG. 6 are identified by the same reference numerals. In this alternative, separation lamellae 13 are designed as one-quarter arcs. In addition, four parallel rows of separation lamellae 13 are provided which are configured as two successively arranged pairs of separation lamellae 13 according to FIG. 6.

Viewed in the direction of flow, the lamellae are arranged so that first separation lamellae 13 are followed by second separation lamellae 13. In the direction of flow, behind second separation lamellae 13, third separation lamellae 13 are arranged, whose alignment corresponds to first separation lamellae 13. Fourth separation lamellae 13 correspond to second separation lamellae 13. The distance E between the first and second rows of separation lamellae 13 with respect to one another is 2 mm, thus causing a less severe reversal of the gas flow and resulting in a smaller pressure drop through separation lamellae 13.

Figure 8:
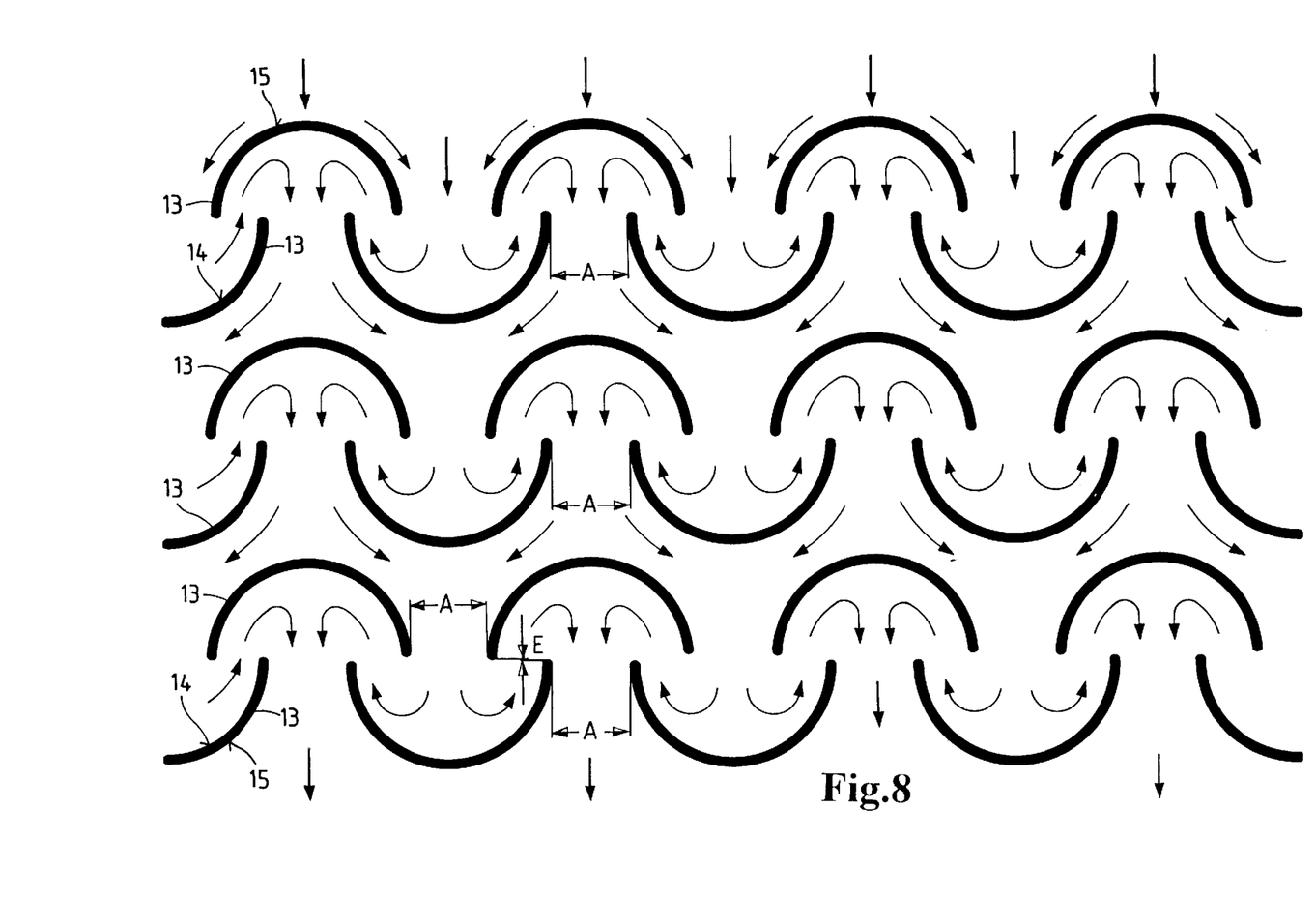
FIG. 8 shows a schematic diagram of a flow stream in yet another inertial separator embodiment.

FIG. 8 shows a schematic diagram of an alternative flow stream through separation lamellae 13. Parts which correspond to FIG. 6 are identified by the same reference numerals. Separation lamellae 13 have a semicircular design in this alternative. The distance E between the respective rows of separation lamellae 13 is zero. Interval A between the separation lamellae 13 of each row is approximately 20 mm. For this interval A, inertial separator 10 (according to one of FIGS. 1 through 4) creates a lower pressure drop than that for interval A from FIG. 6.

In the alternative described in FIG. 8, separation lamellae 13 are arranged in six parallel rows, with two successive rows always being disposed with their concave sides 14 opposite one another. The separation region is thus formed by three separation lamellae 13 arranged in pairs. This threefold separation region has a higher separation rate than a separation region formed by two separation lamellae 13.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An inertial separator for separating particles or droplets from a gas stream, said separator comprising a gas inlet, a gas outlet, and a plurality of separation lamellae arranged between the inlet and the outlet, said separation lamellae each having an arcuately-shaped design with a concave side and a convex side; at least two first separation lamellae being linearly arranged next to one another separated by an interval A with their convex sides facing the inlet; at least two second separation lamellae being arranged offset from the linearly arranged first separation lamellae with the concave sides of the second separation lamellae arranged opposite the concave sides of the first separation lamellae, and wherein a drainage slope for the separated impurities is provided on the separation lamellae.

2. An inertial separator according to claim 1, wherein the drainage slope is arranged on the second separation lamellae and terminates adjacent the first separation lamellae.

3. An inertial separator according to claim 1, further comprising a drain spout arranged on the drainage slope.

4. An inertial separator according to claim 1, wherein the separation lamellae are arranged at an angle of between 90° and 180° with respect to the inlet.

5. An inertial separator according to claim 1, wherein the separation lamellae have edge regions which are designed for optimum flow.

6. An inertial separator according to claim 1, wherein the separation lamellae have a cross sectional configuration which forms a circular segment of from one-quarter to three-quarters of a circle.

7. An inertial separator according to claim 6, wherein the circular segments of the separation lamellae partially overlap with one another.

8. An inertial separator according to claim 1, further comprising a closeable liquid drain underneath the separation lamellae.

9. An oil module for an internal combustion engine, having an inlet aperture for crankcase gas, wherein an inertial separator according to claim 1 is integrated therein.

10. A cylinder head cover for an internal combustion engine, having a gas inlet connection and a gas outlet connection, wherein an inertial separator according to claim 1 is integrated therein.

11. An intake module for an internal combustion engine comprising an air inlet and an air outlet, wherein the air inlet is connected so as to communicate with the internal combustion engine, and an inertial separator according to claim 1 is integrated therein.

* * * * *